(12) United States Patent
Schuler et al.

(10) Patent No.: US 6,382,936 B1
(45) Date of Patent: May 7, 2002

(54) ELECTRIC MOTOR AND FAN WHEEL COMBINATION, AND METHOD FOR PRODUCING IT

(75) Inventors: Dieter Schuler; Gerald Kuenzel, both of Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,342

(22) PCT Filed: Jul. 30, 1999

(86) PCT No.: PCT/DE99/02349

§ 371 Date: Aug. 31, 2000

§ 102(e) Date: Aug. 31, 2000

(87) PCT Pub. No.: WO00/22717

PCT Pub. Date: Apr. 20, 2000

(30) Foreign Application Priority Data

Oct. 12, 1998 (DE) .......................................... 198 46 919

(51) Int. Cl.[7] ................................................ F04B 17/00
(52) U.S. Cl. .................... 417/423.1; 29/888.2; 415/229; 384/204; 416/204 R; 416/244 R; 416/174; 417/423.12
(58) Field of Search ......................... 417/423.1, 423.12; 29/888.2; 415/229; 416/204 R, 244 R, 174; 384/204

(56) References Cited

U.S. PATENT DOCUMENTS 3,624,434 A * 11/1971 Dafler et al. .................. 310/90

* cited by examiner

Primary Examiner—Michael Koczo
Assistant Examiner—William Rodriguez
(74) Attorney, Agent, or Firm—Ronald E. Greigg

(57) ABSTRACT

An electric motor having a housing, having an armature, having an armature shaft supported in two slide bearings, where one of the slide bearings axially displaceably receives the armature shaft and the other slide bearing limits an axial displaceability of the armature shaft by the disposition of a stop disk between a slide bearing bush of the slide bearing and the armature, by the disposition of an axial stop, in the form of a stop ring pressed over one end of the armature shaft. The armature shaft end protrudes out of the housing and is intended for carrying and driving a fan wheel that has a hub which is located adjacent the particular a slide bearing that receives only radial forces. The armature shaft end that carries the fan wheel is associated with the particular slide bearing that is designed as a bidirectionally acting axial bearing, and the hub of the fan wheel is brought so close to a face-end running face of the slide bearing bush that this hub on its face end forms an axial stop of the axial bearing. As a result, a special stop ring is unnecessary.

11 Claims, 3 Drawing Sheets

ELECTRIC MOTOR AND FAN WHEEL COMBINATION, AND METHOD FOR PRODUCING IT

BACKGROUND OF THE INVENTION

1. Field of the Invention

The invention is based on an electric motor and fan wheel combination as defined hereinafter.

2. Description of Related Prior Art

U.S. Pat. No. 3,264,506 discloses an electric motor and fan wheel combination having a housing, having an armature and a collector in the housing, two slide bearings in the housing, an armature shaft supported by means of the slide bearings and carrying the armature and the collector. The armature has an armature shaft end protruding out of the housing, and a fan wheel that has a hub which is secured to the armature shaft end. Both slide bearings have slide bearing bushes, disposed in such a way that they can execute tilting motions, with face-end bearing faces, so that the slide bearing bushes together with the armature shaft form two radial bearings, and that face-end bearing faces of the two slide bearing bushes oriented toward the armature and the collector, together with annular disks built in between them and the armature and the collector and surrounding the armature shaft, additionally form two axial bearings. These axial bearings limit the displaceability of the armature shaft in the axial direction. To enable setting the axial play to a magnitude of substantially 0.125 mm, for example, the housing of the electric motor comprises two substantially cup-shaped housing parts, one of which can be inserted in telescoping fashion into the other to reduce the originally excessive longitudinal armature play to the desired value, which is associated with less noise in operation of the electric motor. Once the axial play has been set to the intended value, weld seams are made on the two housing parts, so that the mutual orientation of the housing parts and thus the set axial play are preserved. In this state, the hub of the fan wheel has an axial spacing from an adjacent bearing bush. The annular disks are made from sheet steel, for instance, and are embodied on their circumference in the manner of the rim of a plate, so that in addition to furnishing axial bearing slide faces, they also act as spinner rings for oil, with which the porous slide bearing shells are saturated.

U.S. Pat. No. 3,624,434 discloses an electric motor that is intended for instance for combination with the fan wheel of the aforementioned U.S. Pat. No. 3,264,506. This electric motor has a housing, an armature, a collector, and two slide bearings in the housing. An armature shaft is supported by means of the slide bearings and carries both the armature and the collector and has an armature shaft end protruding out of the housing, on which end a hub of the fan wheel is secured. Both slide bearings have slide bearing bushes with face-end bearing faces, the slide bearings receiving the armature shaft, and both face-end bearing faces of one of the slide bearing bushes, together with an annular disk disposed between the collector and this slide bearing bush about the armature shaft, and with an axial bearing, press-fitted on the far side of the annular disk on a free end of the armature shaft that is inserted through the slide bearing, forms a bidirectional axial bearing for the armature shaft. As a result, the slide bearing, formed of the annular disk, the axial stop ring and the sliding bush located between them, forms what in German is called a fixed bearing, while conversely the other slide bearing, which is adjoined by the armature shaft end intended for the fan wheel, is known in German as a loose bearing. What this means is that this loose bearing generates only radial bearing forces and does not present any resistance to displacement of the armature shaft, or in other words loosely receives the armature shaft in the is axial direction. The annular disk, as a component of the axial bearing, is made from sheet metal and has a rim similar to that of a plate, so that the annular disk, in addition to furnish an axial bearing face, also acts as an oil spinner ring to prevent oil from migrating out of the porous slide bearing bush to the collector.

SUMMARY OF THE INVENTION

The electric motor and fan wheel combination according to the invention is economical, because a hub, which is required anyway, of the fan wheel, makes the task of the axial stop ring of the prior art for forming an axial bearing unnecessary. This accordingly saves on installation space in the housing of the electrical motor in the prior art that is intended for the axial stop ring.

By means of the characteristics recited herein advantageous embodiments of the electric motor and fan wheel combination defined are possible.

The definitive characteristics set forth herein have an advantage of an elastic and thus noise-reducing limitation of the displaceability of the armature shaft relative to the housing of the electric motor. Accordingly, the hub of the fan wheel is prevented from striking the slide bearing bush hard and thus the projection of irritating clacking noises through the housing of the electric motor of the fan wheel is averted.

Other definitive characteristics disclose an exemplary embodiment that can be produced economically.

Yet other definitive characteristics set forth can be employed alternatively and offer the advantage of easier mounting of the hub of the fan wheel on the armature shaft end, because a press fit can be embodied less rigidly. For the exemplary embodiments set forth, a sliding fit suffices for disposing the respective hub on the armature shaft end.

The method defined by the characteristics the advantage that to set the axial play, there is no need to introduce a feeler gauge between the slide bearing bush and the hub of the fan wheel. As a result, beginning at the hub, a carrier body that carries a number of fan blades can be embodied in shell-like fashion, surrounding the electric motor over a portion of its length.

The method having the definitive characteristics set forth herein are employed to produce the electric motor and fan wheel combination.

BRIEF DESCRIPTION OF THE DRAWINGS

Four exemplary embodiments of the electric motor and fan wheel combination of the invention are shown in the drawings and described in further detail below.

DESCRIPTION OF THE PREFERRED EMBODIMENTS

Figure 1:
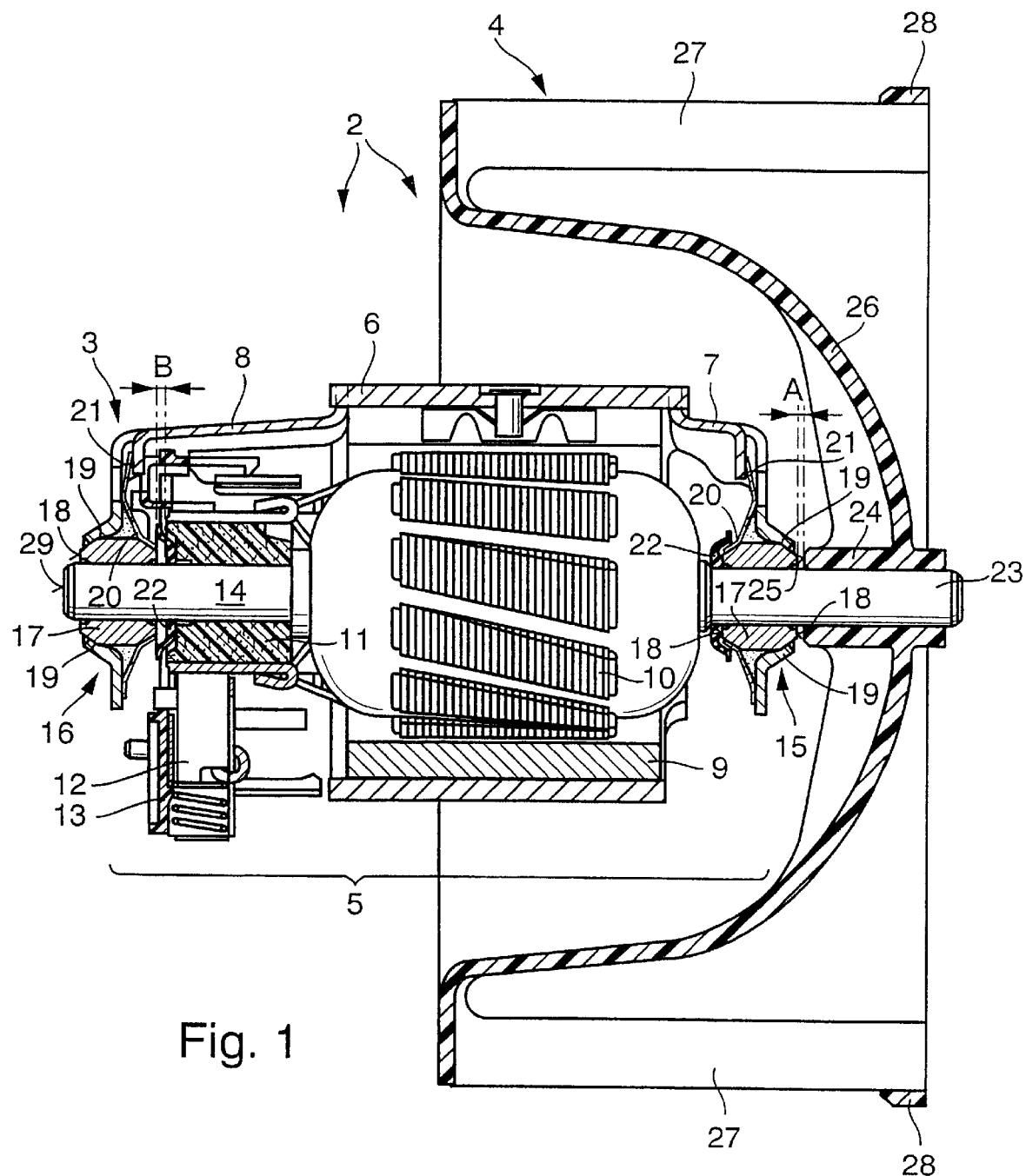
FIG. 1 shows a first exemplary embodiment of the electric motor and fan wheel combination of the invention in longitudinal section.

The first exemplary embodiment of an electric motor and fan wheel combination 2 in FIG. 1 comprises an electric motor 3 and a fan wheel 4 that is driven by the electric motor.

The electric motor 3 has a housing 5, which comprises a tubular short-circuit body, 6 and substantially cup-shaped housing parts 7 and 8 attached to the short-circuit body; and at least one permanent magnet 9 disposed in the short-circuit body 6. An armature 10 includes an associated collector 11; at least one carbon brush 12 and carbon brush guide means 13; an armature shaft 14; and two slide bearings 15, 16 that receive the armature shaft 14. In the exemplary embodiment, the slide bearings 16 have slide bearing bushes 17, which have face-end bearing faces 18 that preferably extend in circular-annular fashion. On the outside, the slide bearing bushes, in a manner known per se, have domelike zones 19 for the sake of tiltable reception in the housing parts 7 and 8. To that end, the housing parts 7 and 8 have funnel-like recesses, against which the slide bearing bushes 17 are pressed by spring tongues 20 that originate at clamping brackets 21.

An element 22 that in the manner of an annular disk surrounds the armature shaft 14 and is inserted between the collector 11 and the slide bearing 16, or its slide bearing bush 17, and in the region of its outer rim this element is shaped in platelike fashion, so that the element can act as an oil spinner ring for oil that may creep out of the slide bearing bush 17 along the armature shaft and that should be kept away from the collector 11. A structurally identical element 22 is also inserted between the armature 10 and the slide bearing bush 17 of the slide bearing 15. Here, the element 22 serves as an annular stop disk that cooperates with a face-end bearing face 18 of the slide bearing bush 17. For example, this element 22 is produced from a rubberlike elastic material, such as a thermoplastic elastomer. As a result, the element 22 prevents the creation of metal impact noises on the occasion of unavoidable relative motions of the armature 10 in the direction of the slide bearing bush 17 retained in the housing part 7.

The armature shaft 14 has an armature shaft end 23, which protrudes through the slide bearing bush 17 out of the housing part 7, for supporting and driving the fan wheel 4. To that end, the fan wheel 4 has a hub 24, which encloses the armature shaft end 23 and which in the first exemplary embodiment is press-fitted onto the armature shaft end 23. As a result, the hub 24 is adequately secured both axially and circumferentially relative to the armature shaft end 23. Toward the adjacent bearing face 18 of the slide bearing bush 17, the hub 24 has an axial stop face 25. The element 22 acting here as a stop disk is braced in an arbitrary way, for instance as in the prior art, indirectly in the axial direction relative to the armature 18. In FIG. 1, the element 22 is shown resting on a bearing face 18 of the slide bearing bush 17 located in the housing part 7, while conversely an axial spacing A is shown between the other bearing face 18, which belongs to this slide bearing bush 17, and the axial stop face 25 of the hub 24. This axial spacing A is adjustable by axial orientation of the hub 24 relative to the element 22 supported indirectly on the armature 10. This axial play A is shown exaggeratedly large in FIG. 1 and in practice is set for instance to 0.1 mm.

Between the slide bearing bush 17 and housing part 8 and the element 22 accommodated there, a spacing B is provided. This spacing B is intentionally greater than the above-described spacing A. As a result, the armature shaft is longitudinally displaceable without hindrance, as intended, inside the slide bearing bush 17 carried by the housing part 8, while conversely the displaceability of the armature shaft 14 relative to the slide bearing bush 17 retained in the housing part 7 is limited to the amount of the axial spacing A. As a result, the slide bearing 15 carried by the housing part 7 is both a radial slide bearing and a bidirectional axial bearing and thus is known in German as a so-called fixed bearing. In contrast to this, the other slide bearing 16, as already indicated by the intrinsically unlimited displaceability of the armature shaft 14, is a so-called loose bearing.

Adjoining the hub 24 of the fan wheel 4 is a wheel disk 26, which in the first exemplary embodiment is embodied essentially in keylike form, which has fan blades 27 on its circumference. These blades are shown in simplified fashion and are fixed relative to one another, axially spaced apart from the wheel disk 26, by means of a ring 28. The hub 24, wheel disk 26, fan blades 27 and ring 28 are in this example injection molded as an integral component of a thermoplastic material. However, an engineer is free to produce the fan wheel 4 at least in part of a metal material. For instance, the fan wheel 4 can also be secured on the armature shaft end in accordance with U.S. Pat. No. 3,264,506.

If, as in the example shown in FIG. 1, the keylike wheel disk 26 makes access to the axial play A between the slide bearing bush 17 and the axial stop face 25 of the hub 24 difficult or impossible, then the axial play A is set in accordance with the method described below:

A face end 29, located in the housing part 8, of the armature shaft 14 is braced in a manner not shown once the electric motor 3 has been assembled. Then, counter to the bracing, not shown, the hub 24 is brought into alignment with the armature shaft end 23 and is press-fitted along this end onto the armature shaft 14, leaving an axial spacing between the axial stop face 25 and the associated slide bearing bush 17; this axial spacing is with certainty greater than the axial spacing A to be set. Then, the housing 5 of the electric motor 3 is for instance displaced relative to the armature shaft 14, and the magnitude of the displacement distance is measured, for instance taking into account an incident elastic compression of the element 22 that is associated with the slide bearing 15. From the thus-ascertained displacement measurement, a value on the order of the intended axial play A is subtracted, and the result obtained indicates a displacement measure for a further displacement of the hub 24 relative to the armature 10 by means of a press. This method can be performed for instance by hand or by machine. In the latter case, a controller for the press is needed, which is given its specifications from an automatic displacement travel measuring instrument.

Figure 2:
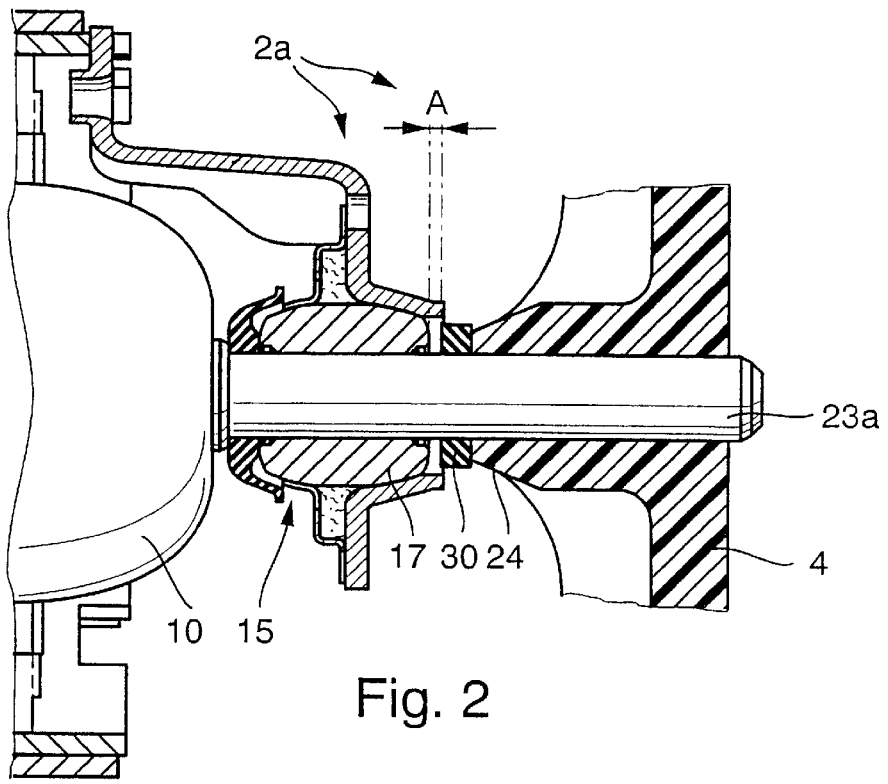
FIG. 2 shows a refinement of the exemplary embodiment of FIG. 1.

The second exemplary embodiment of an electric motor and fan wheel combination 2a of FIG. 2 differs from the exemplary embodiment of FIG. 1 in that a buffer ring 30 is inserted between the hub 24 of the fan wheel 4 and the adjacent slide bearing bush 17 of the slide bearing 15. This buffer ring 30 is for instance, like element 22, produced from a rubberlike elastic material, such as thermoplastic elastomer, and as its name says, it acts as a buffer element on the one hand, but on the other also as a ringlike stop disk, so that as in the example of FIG. 1 the slide bearing 15 also acts as an axial bearing. Once again, an axial play A of this slide bearing 15 is shown exaggeratedly large between the slide bearing bush 17 and the buffer ring 30. The axial play A is shown in the drawing at this point because, as a result of the relative displacement of the housing 5 mentioned in the method described relative to the armature shaft 14 and thus to the armature 10, whenever the buffer ring 30 surrounds the armature shaft end 23 A with radial tension, has a tendency to remain at the hub 24. It can be seen that by the disposition of the buffer ring 30, a direct mechanical contact between the slide bearing bush 17, which is normally made of metal, and the hub 24 of the fan wheel 4, which is made of relatively hard plastic or metal, is avoided. The prevention of a hard mechanical contact by means of the buffer ring 30 is accordingly a noise-abatement provision.

Figure 3:
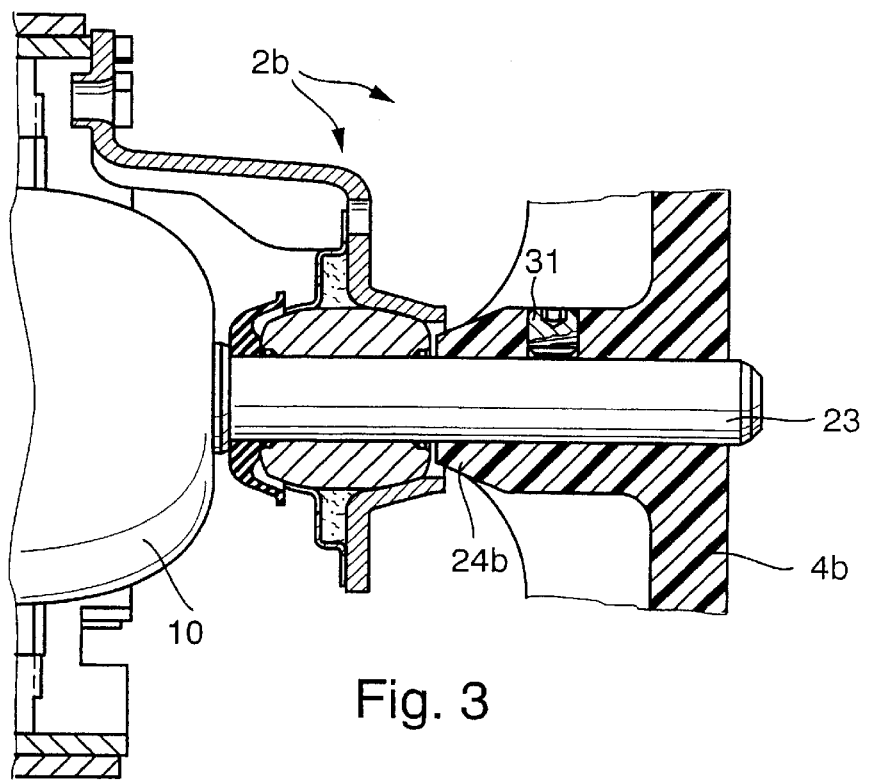
FIG. 3 shows a third exemplary embodiment.

The third exemplary embodiment of an electric motor and fan wheel combination 2b in FIG. 3 differs from the first exemplary embodiment in FIG. 1 in that a hub 24b of a fan wheel 4b is embodied to receive at least one clamping screw 31. For example, this clamping screw 31 has a hexagonal socket 32 known per se and is headless and therefore takes the form of a so-called threaded pin. A clamping screw 31 of this kind can be disposed as a fastening means in addition to the above-described press fit, of the hub 24 on the armature shaft end 23 of the above-described exemplary embodiment. On the other hand, thanks to the disposition of the at least one clamping screw 31, a less-rigid press fit or a transitional fit, even extending to a sliding fit, can also be provided. This makes it easier to adjust the hub 24b relative to the armature 10.

Figure 4:
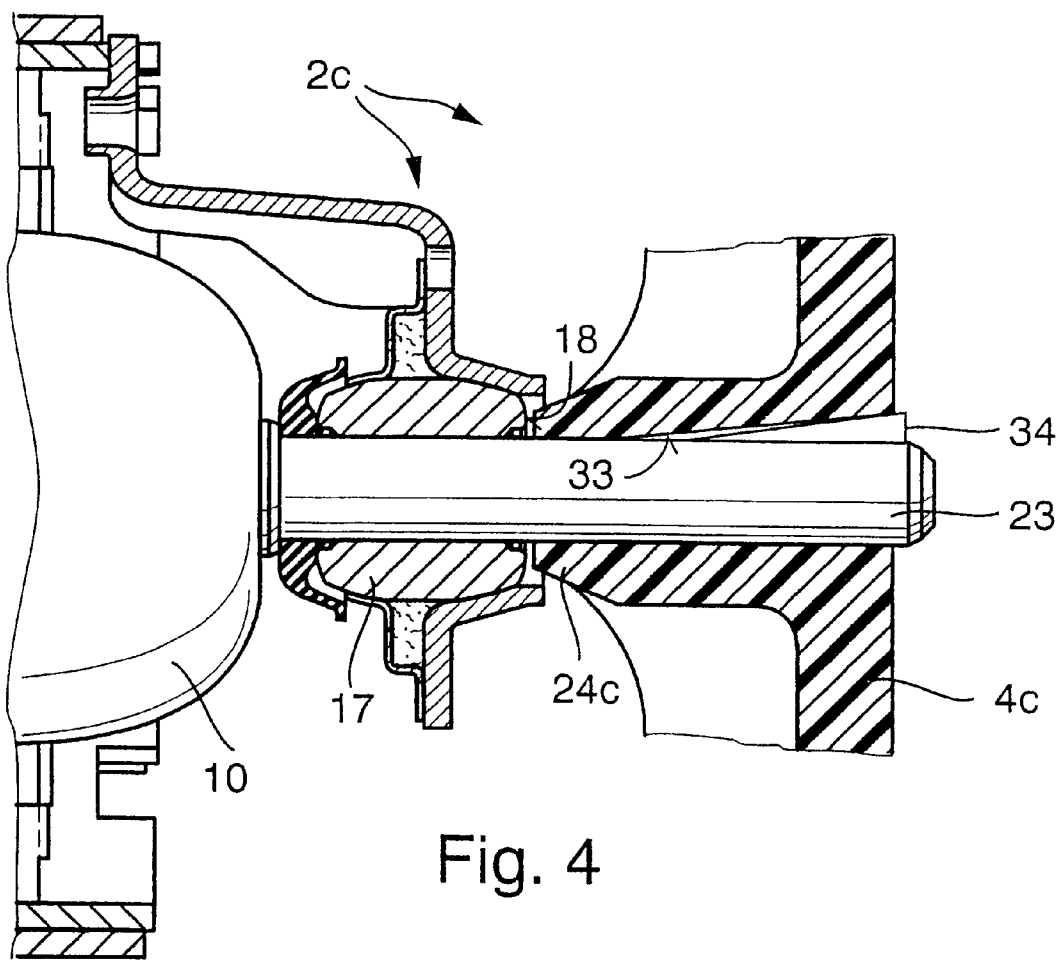
FIG. 4 shows a fourth exemplary embodiment of an electric motor and fan wheel combination.

The fourth exemplary embodiment of an electric motor and fan wheel combination 2c of FIG. 4 differs from the third exemplary embodiment of FIG. 3 in that a hub 24c of a fan wheel 4c has a groove 33, inclined toward the armature shaft end 23, into which a wedge 34 can be driven. As a result, a rigid press fit in the first exemplary embodiment can be dispensed with. For instance, a sliding fit can be provided for the alignment of the hub 24c on the armature shaft end 23, and a displacement resistance that is advantageous for setting the axial play A can be generated by means of the wedge 34, by displacement of the wedge in the groove 33.

From the description of the differences in terms of how the various hubs 24, 24b and 24c are secured to the respective armature shaft end 23, it can be seen that the idea of creating an axial bearing with an adjustable axial play A, with the aid of an axial stop face located on a hub of a fan wheel, is independent of the way in which the applicable hub is in the final analysis secured in an operationally reliable way to the associated armature shaft end. For example, if such a hub is of steel, it could be secured by the provision of a weld seam.

The above-described use of a hub of a fan wheel as a component of an axial bearing, which has a slide bearing bush 17 with end-face bearing faces 18, is not tied to the disposition shown in FIG. 1 of a collector 11. Instead, an axial bearing of the type described can also be used in a differently designed electric motor of an electric motor and fan wheel combination.

The foregoing relates to preferred exemplary embodiments of the invention, it being understood that other variants and embodiments are therefore possible within the spirit and scope of the invention, the latter being defined by the appended claims.

We claim:

1. An electric motor and fan wheel combination, comprising a housing, an armature in the housing, first and second slide bearings (15, 16) in the housing, an armature shaft (14) supported by the first and second slide bearings and carrying the armature (10), the armature has an armature shaft end (23), and a fan wheel (4), said fan wheel has a hub (24) that is secured to the armature shaft end for rotation with the armature shaft end, and the first and second slide bearings have first and second slide bearing bushes (17, 17), each of the first and second slide bearing brushes include inner and outer bearing end faces (18, 18), the first and second slide bearing bushes (17, 17) receive the armature shaft, and the inner end face of the first slide bearing bush (17), together with an annular disk-like element (22) disposed between the armature and the inner bearing end face of the first slide bearing bush surrounds the armature shaft, and an axial stop (25) oriented toward the outer bearing end face of the first slide bearing bush and secured on the armature shaft, form the first slide bearing acting in two directions, and the hub (24, 24b, 24c) of the fan wheel (4, 4b, 4c) forms the axial stop (25) of the first slide bearing (15).

2. The electric motor and fan wheel combination of claim 1, in which a buffer ring (30) of rubberlike elastic material and surrounding the armature shaft end (23) is built-in between the hub (24) of the fan wheel (4) and the outer end of the bearing face end (18) of the first slide bearing bush (17) of the first slide bearing (15).

3. The electric motor and fan wheel combination of claim 1, in which the hub (24) of the fan wheel (4) is press-fitted onto the armature shaft end (23, 23a).

4. The electric motor and fan wheel combination of claim 2, in which the hub (24) of the fan wheel (4) is press-fitted onto the armature shaft end (23, 23a).

5. The electric motor and fan wheel combination of claim 1, in which the hub (24b) of the fan wheel (4b) is fixed on the armature shaft end (23) by means of at least one clamping screw (31).

6. The electric motor and fan wheel combination of claim 2, in which the hub (24b) of the fan wheel (4b) is fixed on the armature shaft end (23) by means of at least one clamping screw (31).

7. The electric motor and fan wheel combination of claim 1, in which the hub (24c) of the fan wheel (4c) is fixed on the armature shaft end (23) by means of a wedge (34).

8. The electric motor and fan wheel combination of claim 2, in which the hub (24c) of the fan wheel (4c) is fixed on the armature shaft end (23) by means of a wedge (34).

9. An electric motor and fan wheel combination as set forth in claim 1, which comprises a second disk-like element between the inner end of the second bush and the armature.

10. A method for producing an electric motor and fan wheel combination, having a housing, an armature in the housing, two slide bearings in the housing, an armature shaft supported by means of the slide bearings and carrying the armature, the armature shaft has an armature shaft end, and a fan wheel, which has a hub that is secured to the armature shaft end, and both slide bearings have slide bearing bushes with bearing faces on the face ends, the slide bearing bushes receiving the armature shaft, and both face-end bearing faces of one of the slide bearing bushes, together with an annular disk-like element disposed between the armature and this slide bearing bush around the armature shaft with an axial stop, oriented toward the opposite face-end bearing face of this slide bearing bush and secured on the armature shaft, form an axial bearing acting in two directions, and the hub of thee fan wheel, with an end oriented counter to the first bearing face of the slide bearing bush, forms the axial stop, the method comprising assembling the electric motor armature shaft, and bearings, after the assembly, the hub (24, b, c) of the fan wheel (4, 4b, 4c) is thrust onto an armature shaft end (23, 23a), leaving a spacing from an adjacent bearing face (18) of the adjacent slide bearing bush (17); displacing the armature shaft (14) at least once; and measuring the displacement distance to provide a value on the order of magnitude (A) of an intended axial play (A), subtracting the value from the measured value of the displacement distance, and that based on a value calculated in this way, a displacement device is assembled for displacing the hub (24, b, c) on the armature shaft end (23, 23a) in the direction of the armature (10) by a displacement distance associated with the calculated value.

11. The method of claim 10, in which a controllable press is used as the displacement device, which, on a face end engaging the hub (24, b, c), presses in the direction of the armature (10), while the armature shaft (14) is braced on a face end.

* * * * *